Oct. 7, 1958  H. M. CYR  2,855,287
FLUID BED ROASTING METHOD FOR SEPARATING
AND RECOVERING Cd-Pb-Zn COMPONENTS
Filed Sept. 26, 1955
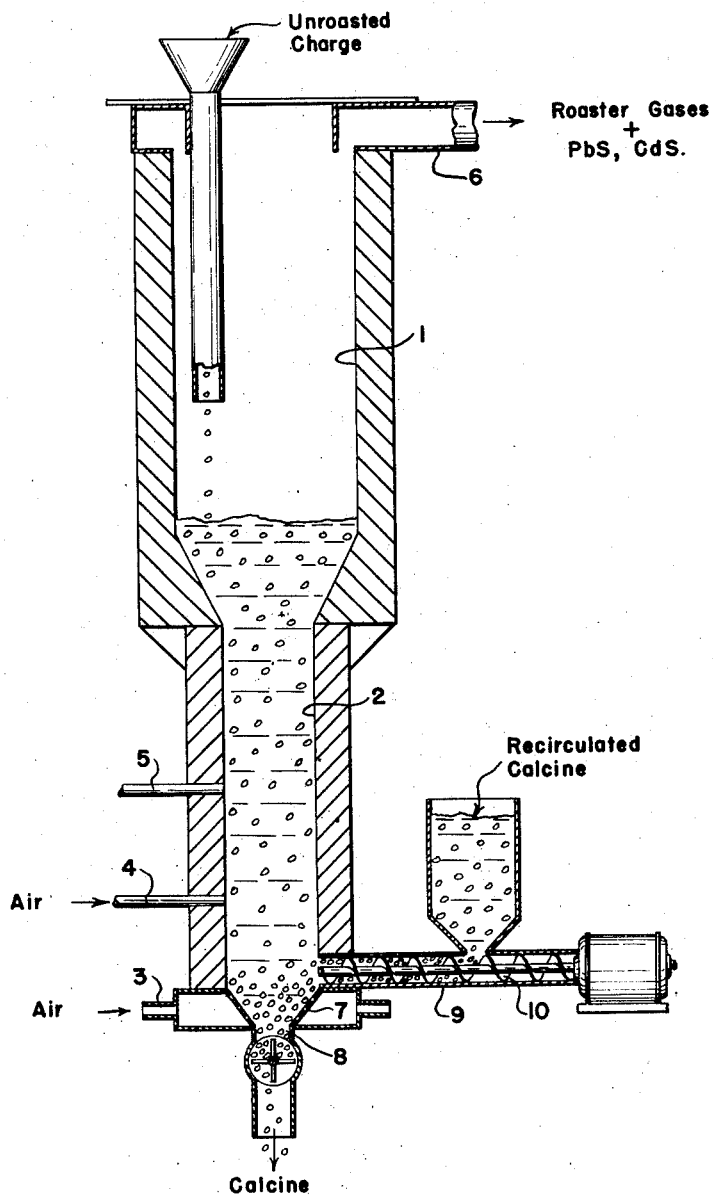
INVENTOR
Howard M. Cyr
BY
ATTORNEYS

United States Patent Office 2,855,287
Patented Oct. 7, 1958

2,855,287

FLUID BED ROASTING METHOD FOR SEPARATING AND RECOVERING Cd-Pb-Zn COMPONENTS

Howard M. Cyr, Palmerton, Pa., assignor to The New Jersey Zinc Company, New York, N. Y., a corporation of New Jersey Application September 26, 1955, Serial No. 536,436

6 Claims. (Cl. 75—9)

This invention relates to the roasting of zinc sulfide ore concentrates and, more particularly, to the separation of cadmium and lead components of zinc sulfide ore concentrates in the course of roasting these concentrates in a fluid bed operation.

In United States Letters Patent No. 2,621,118 there is described a method of roasting zinc sulfide ore concentrates in a multi-bed fluid column. Although this method is extremely effective in so far as roasting is concerned, the cadmium and lead components of the ore are retained in the roasted product with the result that the cadmium and lead appear as impurities in the final zinc metal product obtained by smelting the roasted ore. All attempts to carry out the aforementioned roasting method so as to eliminate a significant proportion of the cadmium and lead components of the ore have met with failure; those fluid bed roasting operations which showed an appreciable amount of cadmium and lead separation were characterized by such high operating temperatures that clinkering of the charge was prohibitively prominent. In all of these operations, as described in the patent, the amount of roasting air supplied to the column was at least equal to, and generally slightly exceeded, the amount of air theoretically required to effect complete roasting of the ore, and this air was so distributed into vertically spaced portions of the column that only a minor proportion of the total roasting air was introduced into the lowermost portion of the roasting column.

I have now discovered that it is possible to obtain at least 75%, and generally at least 90%, elimination of the cadmium and lead components of a zinc sulfide ore concentrate without using temperatures so high as to cause sintering. This result is achieved by a combination of physical and chemical controls which maintain separate but contiguous volatilizing and roasting fluid beds. The physical controls concern the particle size and the relative degrees of agitation of the two fluid beds; the chemical controls concern the amount and distribution of roasting air and the maintenance of an effective but safe volatilizing temperature. The combination of these controls establishes and maintains an upper volatilizing fluid bed and a lower roasting fluid bed which are in direct contact with one another but which do not permit such a degree of short circuiting of solids and gases between the beds as to impair the volatilizing and roasting characters of the beds.

Thus, the method of separating and recovering cadmium and lead components of a finely-divided zinc sulfide ore concentrate pursuant to my invention comprises agglomerating the ore concentrate into discrete particles ranging in size between 4 and 65 mesh and then charging the agglomerates to a mildly agitated fluid bed of the discrete particles positioned above and in direct contact with a more actively agitated columnar fluid bed of the discrete particles. Both of the fluid beds are maintained in the fluidized condition substantially exclusively by the upward flow of gas originating as roasting air introduced into the lowermost bed, the upper fluid bed having a cross-sectional area substantially greater than that of the lower bed so as to establish the aforesaid different degrees of agitation in the two fluid beds. Sulfide-roasting air is introduced into the columnar lower bed so that as it rises through the bed its oxygen content will be consumed by roasting of the zinc sulfide with resulting formation of sulfur dioxide which is withdrawn from the upper fluid bed. The rate of introduction of the roasting air into the lower columnar bed is not significantly in excess of that theoretically required to combine with the zinc sulfide component of the agglomerated ore concentrate charged to the upper bed so that substantially no unconsumed oxygen is present in the sulfur dioxide-containing gases rising from the lower bed into the upper bed. The temperature of the upper fluid bed is maintained at a temperature of at least 1050° C., and preferably at least about 1100° C., the roaster gases issuing from the upper fluid bed are withdrawn, the cadmium and lead sulfides volatilized from the zinc sulfide charge in the upper fluid bed are separated from the withdrawn roaster gases, and the roasted particles (calcine) are discharged from the lower end of the columnar bed.

The method of my invention is applicable to the treatment of any zinc sulfide ore concentrate containing a significant amount of either cadmium or lead or both. These concentrates are generally obtained by crushing the zinc sulfide ore and subsequently separating and collecting the zinc sulfide component of the ore by flotation methods. The resulting concentrate is in very finely divided form and should be agglomerated into aggregates or discrete particles of such size that the particles range between 4 and 65 mesh (Tyler standard). Within this range of particle size, I have obtained particularly satisfactory results with particles falling within the range of 6 to 20 mesh. By agglomerating the ore concentrate to particles of this size range, I find that volatilization of the cadmium and lead and roasting of the zinc sulfide can be effectively achieved with dust losses maintained below 30% and generally within the range of 10 to 25%.

The zinc sulfide ore concentrates in fine form may be agglomerated by any suitable procedure. For example, I have obtained wholly satisfactory results by wetting the fine ore concentrate with water and adding 1% to 3½% by weight of bentonite as a binder, rolling the mixture in a rotary drum, extruding the moistened mass through openings of appropriate size, followed by drying and crushing to size. When sulfite liquor is used as a binder, in lieu of or in addition to the bentonite, I have found that from 2 to 5% sulfite liquor and from 6 to 10% total water gives satisfactory results. However, zinc sulfate has also been used successfully as a binder. Regardless of whether the discrete particles of the agglomerated zinc sulfide or concentrate are formed by the aforementioned procedure or by any other type of pelleting technique, the discrete particles of the agglomerated ore concentrate having the aforementioned size range are amenable to the establishment of superimposed volatilizing and roasting fluid beds pursuant to my invention.

A mass of these discrete particles charged to an upper enlarged portion of a substantially columnar vessel is maintained in fluidized condition in the practice of my invention by introducing roasting air substantially exclusively into the lower portion of the column. By maintaining a mass of the charge in the upper enlarged portion of the vessel, this roasting air establishes and maintains the fluidization of solids in the vessel characterized by a mildly agitated fluidized condition in the upper bed of relatively large cross-sectional area and by more actively agitated fluidized conditions in the lower columnar fluid bed. The relative difference in the degrees of agitation of the two fluid beds is established by proportioning the dimensions of the vessel as shown in the single figure of the drawings in which the figure is a cross-sectional elevation of a roasting vessel suitable for the practice of my invention.

It will be seen from the figure that the cross-sectional area of the upper portion 1 of the vessel is at least double that of the lower columnar portion 2 of the vessel. The only upper limit to the cross-sectional size of the upper portion of the vessel is that it be not so great as to preclude the establishment of fluidized conditions when a highly active fluidized condition prevails in the lower columnar portion of the vessel, it being understood of course that fluidization of solids in the upper portion of the vessel is effected substantially exclusively by the roasting air introduced into the lower columnar portion of the vessel.

I have found that volatilizing conditions cannot be established and maintained in the upper portion of the treating vessel unless the total amount of roasting air introduced into the lower columnar portion of the vessel is limited at most to that amount theoretically required to combine with the zinc sulfide component of the charge. In order to insure this control, I have found it advantageous to limit the rate of introduction of roasting air to between about 75% to about 90% of that required theoretically to oxidize the zinc sulfide component of the material charged to the upper end of the vessel. However, I have further found that volatilizing conditions in the upper fluidized bed cannot be effectively established and maintained, even with the aforementioned control in the total amount of roasting air, unless this air is introduced into the columnar portion of the vessel so that from 60% to 100% of the total amount of air is delivered into the lowermost portion of the roasting column, the remainder, if any, being delivered into a portion of the roasting column spaced above the level of introduction of the major portion of the roasting air but nevertheless at a level a substantial distance below the bottom of the upper volatilizing bed. In general, I have found it to be particularly advantageous to proportion the roasting air delivery to the roasting column so that between 70 and 90%, and preferably 80%, of the air is introduced through a primary inlet line 3 into the lowermost portion of the column, the remainder being introduced into a somewhat higher portion of the column through a secondary inlet line 4 positioned well below the upper end of the columnar body of the vessel. As described in the aforementioned patent, the roasting air introduced into the upper portion of the column may be introduced in the form of a single supply through the secondary inlet line 4 or in the form of a divided supply which is introduced at vertically spaced levels through the secondary inlet line 4 and a tertiary inlet line 5. Thus, the total roasting air supplied to the column pursuant to my present invention is introduced into the column at one or more different levels. Regardless of the actual position of these levels with respect to one another, an upper volatilizing zone will be maintained in the relatively quiescent fluid bed on top of the lower columnar fluid bed provided that the total roasting air is introduced into the columnar bed in such manner as to insure the maintenance of substantially non-roasting conditions in the upper bed supported by the columnar bed. Under these conditions, the upper fluid bed will comprise a volatilizing zone for the cadmium and lead components of the zinc sulfide ore concentrate charged to the vessel provided that a temperature of at least about 1100° C. is maintained in this upper zone of the column.

The exothermic heat of reaction between the roasting air and the zinc sulfide component of the charge is generally more than adequate to supply the heat necessary to establish and maintain a temperature of at least 1050° C. in the upper bed supported by the fluidized column. Conservation of this roasting heat by external insulation surrounding the roasting column is usually sufficient to permit maintenance of an upper volatilizing bed temperature of at least about 1100° C. When the geometry of the roasting vessel is such that it is necessary to supply the upper portion of the roasting air at a level so high as to endanger the maintenance of non-roasting conditions in the upper bed, or if nearly "theory" air is used in order to obtain maximum sulfur removal, the desired non-roasting conditions can be assured by introducing a solid fuel into the upper bed. The use of about 5 to 10% by weight of coal in admixture with the charge is presently preferred. This added fuel will combine more readily than zinc sulfide with any free air in the volatilizing zone and in this way will insure the maintenance of substantially non-roasting but effective volatilizing conditions in the upper bed in which a relatively quiescent fluidized condition prevails.

When the aforementioned conditions are maintained in the roasting column and superimposed volatilizing bed, at least 75%, and generally at least 90%, of the cadmium and lead components of the zinc sulfide charge will be volatilized in the upper bed and will be removed with the roaster gases withdrawn through the effluent line 6. Upon cooling of these gases, the cadmium and lead compounds (initially predominantly sulfides) are solidified and may be separated from the sulfur dioxide-containing roaster gases by any conventional means such as a gas scrubber, electrostatic precipitator, or the like.

The maintenance of such an elevated temperature of at least 1050° C., and preferably at least 1100° C., in the upper bed of enlarged cross-sectional area and the introduction of a major portion of the roasting air into the lowermost portion of the columnar bed therebelow tend to promote the development of conditions in the lowermost portion of the columnar bed conducive to the formation of a clinker or sintered product. In order to minify the danger of clinkering in practicing the method of my invention I have found it advantageous to provide the lowermost end of the roasting vessel with a bed-supporting grate 7 having the shape of an inverted cone. This grate configuration prevents the charge from accumulating in the lowermost corners at the bottom of the roaster and more effectively discharges the roasted charge from the calcine outlet 8 as it is produced. By eliminating pockets where the roasted charge might become quiescent at the elevated temperature prevailing in the lowermost portion of the column, I have found that clinker formation is substantially completely eliminated.

In addition to the use of a conically shaped grate at the bottom of the fluidized column, I have found that the return of relatively cool calcine (that is, previously roasted charge) through a calcine return line 9 provided with a screw feed 10, positioned adjacent the lowermost end of the fluidized column, further controls the temperature conditions prevailing in this portion of the column and inhibits clinker formation. This result appears to be achieved not only by virtue of the cooling action of the recirculated calcine but also because the added calcine increases the volume of roasted material which can be withdrawn from the lowermost end of the fluidized column. In this way, substantially continuous discharge of roasted material may be maintained at the calcine outlet 8, with the result that there is little if any opportunity for the roasted charge to become quiescent near the supporting grate and to sinter while it is still within the columnar fluid bed. By using the aforementioned conically shaped grate at the bottom of the roaster and by returning to the lowermost portion of the fluidized column directly above this grate through the return line 9 approximately 50% of the roasted product or calcine discharged from the grate, I have found that it is possible to operate continuously in such manner as to maintain highly exothermic roasting conditions in the columnar fluid bed and non-roasting but volatilizing conditions in the upper relatively quiescent fluid bed without any interruption of the operation by clinker formation in spite of the fact that a temperature of at least 1100° C. prevailed throughout substanially the full height of the fluidized column.

The aforementioned physical and chemical controls are important to the success of my roasting method. For example, discrete particles of zinc sulfide ore obtained by crushing the ore rather than by agglomerating a finely divided ore concentrate roast so slowly in a fluid bed that autogenous conditions cannot be achieved. If heat had to be delivered to the charge through the walls of the roasting vessel, local overheating near the walls would cause sintering of the charge; on the other hand, the development of heat generated internally within the roasting vessel would require such a large volume of air as to interfere with the volatilizing operation as well as with the fluidized conditions which should prevail throughout the roasting and volatilizing zones. It is the maintenance of relatively quiescent fluidized conditions in the upper volatilizing zone in direct contact with the relatively active fluidized conditions in the heat-generating roasting zone which make possible the establishment of contiguous volatilizing and roasting zones characterized in accordance with my invention by substantially complete thermal equilibrium without significant short-circuiting of either solids or gases between the two zones. Thus, pursuant to the method of my invention, substantially completely non-oxidizing conditions can be maintained in the quiescent upper zone so as to retain the cadmium and lead in their as-charged sulfide form for a sufficient period of time to permit selective volatilization of the cadmium and lead sulfides from the zinc sulfiide, yet the heat for this volatilizing zone is supplied by the effective roasting of an active fluid bed maintained in direct communication with the lower end of the volatilizing zone. The maintenance of the volatilizing and roasting zones in the form of contiguous and directly communicating fluid beds free of any mechanical separation, makes possible continuous operation merely by feeding the agglomerated ore concentrate to the upper volatilizing zone and discharging roasted agglomerates from the bottom of the lower roasting zone. Both feed and discharge may be continuous or intermittent without significantly affecting the continuous character of my method in which the charge moves progressively, and without significant short-circuiting, through the volatilizing and roasting zones.

The effectiveness of the roasting zone in the practice of my invention is evidenced by the fact that the roasted product or calcine generally contains only from about 1% to about 5% by weight of residual sulfur. Lower residual sulfide contents within this range are obtained when the total amount of roasting air approaches that theoretically required to effect complete roasting of the zinc sulfide component of the charge, and residual sulfur contents within the upper portion of the aforementioned range are obtained when only about 90% of the "theory" air is used. However, I have found that this residual sulfur content is a small price to pay for the effective elimination of cadmium and lead components of the charge which is achieved by the practice of my method. In fact, I have found that the provision of a non-fluidized bed of discharged calcine immediately below the grate which supports the fluidized column can be used to effect substantially complete removal of the residual sulfur content of the calcine discharged from the grate without requiring additional heat or fuel.

The following specific examples are illustrative of the practice of my invention:

A number of runs, each of 5 to 8 hours' duration, were made in a roasting furnace such as that shown in the drawings. The lower columnar portion of the furnace was of cylindrical shape having an internal diameter of 1 foot and a height of about 3½ feet. The conical portion of the furnace interconnecting the lower columnar portion with the upper enlarged portion had a height of 11 inches. The upper enlarged cylindrical portion of the furnace had an internal diameter of 2 feet and a height of 4⅓ feet. The furnace was charged with Ascot zinc sulfide ore flotation concentrate containing 0.4% lead and 0.3% cadmium by analysis, both the lead and cadmium being present in the form of sulfides. The ore concentrate was agglomerated into the form of discrete particles or pellets having a size range of about through 6 and on 20 mesh (Tyler standard). The pellets were charged to the top of the furnace and the roasted pellets (calcine) were discharged from the conically shaped grate at the bottom of the furnace. Roasting air was delivered through an air inlet at the bottom of the furnace and through an auxiliary air inlet positioned 15 inches above the grate, 80% of the roasting air being injected at the bottom of the column and the remaining 20% of the roasting air was injected through the aforementioned auxiliary inlet. Roasted ore or calcine, previously discharged from the bottom of the furnace, was returned to the furnace after cooling. The entire furnace was maintained under fluo-solids conditions exclusively by the roasting air so that a zone of relatively active fluidized charge prevailed throughout the lower columnar portion of the furnace and a zone of mildly agitated fluidized charge was maintained to a depth of about 12 inches in the upper enlarged portion of the furnace which had a cross-sectional area 4 times as large as that of the lower columnar portion of the furnace. Anthracite coal was added along with the green pellet charge in order to facilitate the maintenance of non-oxidizing conditions in the fluid bed in the enlarged upper portion of the furnace.

In the representative runs reported in the following table, all tests were made with Ascot zinc sulfide concentrates which were pelleted with 3½% bentonite binder. The mix in run A was pre-densified in a "chaser" before pelleting and was processed unusually long to form very dense pellets. The charge used in runs B, C and D was prepared without chasing and with no attempt to form strong, dense pellets. The difference in cadmium and lead elimination and in dust loss using these two types of pellets is readily seen by comparison of runs A and B. Run C was carried out using a lower air:core ratio than in runs A and B, and run D was carried out with a higher air:ore ratio than that used pursuant to my invention.

| Run | Duration, Hours | Feed Rates, Lb./Hr. | | | Roasting Air | | Temperature, °C. (Av.) | Percent Dust Loss | Percent Sulfide in Calcine | Percent Elimination | |
|---|---|---|---|---|---|---|---|---|---|---|---|
| | | Green Pellets | Anthracite Coal | Recycled Calcine | Volume Cu. Ft./Min. | Percent of "Theory" | | | | Pb | Cd |
| A | 5 | 240 | 24 | 319 | 130 | 90 | 1,090 | 9 | 2.7 | 84 | 96 |
| B | 8 | 240 | 24 | 208 | 130 | 90 | 1,090 | 25 | 1.8 | 92 | 98 |
| C | 8 | 265 | 26.5 | 209 | 130 | 80 | 1,090 | 14 | 4.0 | 95 | 99 |
| D | 5 | 275 | 14 | 0 | 150 | 105 | 1,090 | 32 | 0.13 | 53 | 79 |

It will be readily appreciated, from the results reported in the foregoing table, that stronger pellets are conducive to a lower dust loss than weaker pellets but that a somewhat higher lead and cadmium elimination is obtained with the weaker and more porous pellets than with the stronger and more dense pellets. Comparison of runs B and C shows that by lowering the air:ore ratio from 90% to 80% of "theory" air, there is obtained a still higher degree of lead and cadmium elimination although at the expense of poorer sulfide-sulfur elimination from the roasted charge. Comparison of runs A, B or C with run D shows the relatively poor lead and cadmium elimination, as well as high dust loss, which is obtained when the air:ore ratio exceeds the "theory" amount, even when a relatively small amount of coal is present in the charge to help maintain only mildly oxidizing conditions in the upper volatilizing zone in the enlarged upper portion of the furnace. Thus, in runs A, B and C, which are representative of the practice of my invention, the high degree of lead and cadmium separation from the zinciferous charge characterizes my method as one of lead and cadmium elimination rather than merely a separation of the charge into two fractions of relatively low and relatively high lead and cadmium contents. Similarly high elimination of any antimony, arsenic and tin present in a zinc sulfide ore concentrate is obtained by the practice of my invention.

I claim:

1. The method of separating and recovering cadmium and lead components of a finely-divided zinc sulfide ore concentrate in a fluid bed roasting operation which comprises agglomerating the ore concentrate into discrete particles ranging in size between 4 and 65 mesh, charging the agglomerates to a mildly agitated fluid bed of the discrete particles positioned above and in direct contact with a more actively agitated columnar fluid bed of the discrete particles, both fluid beds being maintained in the fluidized condition substantially exclusively by the upward flow of gas originating as roasting air introduced into the lowermost bed, the upper fluid bed having a cross-sectional area substantially greater than that of the lower bed so as to establish the aforesaid different degrees of agitation in the two fluid beds, introducing sulfide-roasting air into the columnar lower bed so that as it rises through the bed its oxygen content will be consumed by roasting of the zinc sulfide with resulting formation of sulfur dioxide which is withdrawn from the upper fluid bed, from 60% to 100% of the roasting air introduced into the columnar lower bed being delivered to the lowermost portion of this bed, the rate of introduction of said roasting air being not limited at most to that theoretically required to combine with the zinc sulfide component of the agglomerated ore concentrate charged to the upper bed so that substantially no unconsumed oxygen is present in the sulfur dioxide-containing gases rising from the lower bed into the upper bed, maintaining the upper fluid bed at a temperature of at least about 1050° C., discharging substantially lead- and cadmium-free roasted pellets from the lower end of the columnar fluid bed, withdrawing roaster gases issuing from the upper fluid bed, and separating from the withdrawn roaster gases the cadmium and lead sulfides volatilized from the zinc sulfide charge in the upper fluid bed.

2. The method of separating and recovering cadmium and lead components of a finely-divided zinc sulfide ore concentrate in a fluid bed roasting operation which comprises agglomerating the ore concentrate into discrete particles ranging in size between 6 and 20 mesh, charging the agglomerates to a mildly agitated fluid bed of the discrete particles positioned above and in direct contact with a more actively agitated columnar fluid bed of the discrete particles, both fluid beds being maintained in the fluidized condition substantially exclusively by the upward flow of gas originating as roasting air introduced into the lowermost bed, the upper fluid bed having a cross-sectional area substantially greater than that of the lower bed so as to establish the aforesaid different degrees of agitation in the two fluid beds, introducing sulfide-roasting air into the columnar lower bed so that as it rises through the bed its oxygen content will be consumed by roasting of the zinc sulfide with resulting formation of sulfur dioxide which is withdrawn from the upper fluid bed, from 60% to 100% of the roasting air introduced into the columnar lower bed being delivered to the lowermost portion of this bed, the rate of introduction of said roasting air being limited at most to that theoretically required to combine with the zinc sulfide component of the agglomerated ore concentrate charged to the upper bed so that substantially no unconsumed oxygen is present in the sulfur dioxide-containing gases rising from the lower bed into the upper bed, maintaining the upper fluid bed at a temperature of at least about 1100° C., discharging substantially lead- and cadmium-free roasted pellets from the lower end of the columnar fluid bed, withdrawing roaster gases issuing from the upper fluid bed, and separating from the withdrawn roaster gases the cadmium and lead sulfides volatilized from the zinc sulfide charge in the upper fluid bed.

3. The method of separating and recovering cadmium and lead components of a finely-divided zinc sulfide ore concentrate in a fluid bed roasting operation which comprises agglomerating the ore concentrate into discrete particles ranging in size between 4 and 65 mesh, charging the agglomerates to a mildly agitated fluid bed of the discrete particles positioned above and in direct contact with a more actively agitated columnar fluid bed of the discrete particles, both fluid beds being maintained in the fluidized condition substantially exclusively by the upward flow of gas originating as roasting air introduced into the lowermost bed, the upper fluid bed having a cross-sectional area substantially greater than that of the lower bed so as to establish the aforesaid different degrees of agitation in the two fluid beds, introducing sulfide-roasting air into the columnar lower bed so that as it rises through the bed its oxygen content will be consumed by roasting of the zinc sulfide with resulting formation of sulfur dioxide which is withdrawn from the upper fluid bed, from 60% to 100% of the roasting air introduced into the columnar lower bed being delivered to the lowermost portion of this bed, the rate of introduction of said roasting air being between about 80% and 90% of that theoretically required to combine with the zinc sulfide component of the agglomerated ore concentrate charged to the upper bed so that substantially no unconsumed oxygen is present in the sulfur dioxide-containing gases rising from the lower bed into the upper bed, maintaining the upper fluid bed at a temperature of at least about 1100° C., discharging substantially lead- and cadmium-free roasted pellets from the lower end of the columnar fluid bed, withdrawing roaster gases issuing from the upper fluid bed, and separating from the withdrawn roaster gases the cadmium and lead sulfides volatilized from the zinc sulfide charge in the upper fluid bed.

4. The method of separating and recovering cadmium and lead components of a finely-divided zinc sulfide ore concentrate in a fluid bed roasting operation which comprises agglomerating the ore concentrate into discrete particles ranging in size between 4 and 65 mesh, charging the agglomerates to a mildly agitated fluid bed of the discrete particles positioned above and in direct contact with a more actively agitated columnar fluid bed of the discrete particles, both fluid beds being maintained in the fluidized condition substantially exclusively by the upward flow of gas originating as roasting air introduced into the lowermost bed, the upper fluid bed having a cross-sectional area about 4 times as large as that of the lower bed so as to establish the aforesaid different degrees of agitation in the two fluid beds, introducing sulfide-roasting air into the columnar lower bed so that as it rises through the bed its oxygen content will be consumed by roasting of the zinc sulfide with resulting formation of sulfur dioxide which is withdrawn from the upper fluid bed, from 60% to 100% of the roasting air introduced into the columnar lower bed being delivered to the lowermost portion of this bed, the rate of introduction of said roasting air being limited at most to that theoretically required to combine with the zinc sulfide component of the agglomerated ore concentrate charged to the upper bed so that substantially no unconsumed oxygen is present in the sulfur dioxide-containing gases rising from the lower bed into the upper bed, maintaining the upper fluid bed at a temperature of at least about 1100 C., discharging substantially lead- and cadmium-free roasted pellets from the lower end of the columnar fluid bed, withdrawing roaster gases issuing from the upper fluid bed, and separating from the withdrawn roaster gases the cadmium and lead sulfides volatilized from the zinc sulfide charge in the upper fluid bed.

5. The method of separating and recovering cadmium and lead components of a finely-divided zinc sulfide ore concentrate in a fluid bed roasting operation which comprises agglomerating the ore concentrate into discrete particles ranging in size between 4 and 65 mesh, charging the agglomerates in admixture with a minor proportion of solid carbonaceous material to a mildly agitated fluid bed of the discrete particles positioned above and in direct contact with a more actively agitated columnar fluid bed of the discrete particles, both fluid beds being maintained in the fluidized condition substantially exclusively by the upward flow of gas originating as roasting air introduced into the lowermost bed, the upper fluid bed having a cross-sectional area substantially greater than that of the lower bed so as to establish the aforesaid different degrees of agitation in the two fluid beds, introducing sulfide-roasting air into the columnar lower bed so that as it rises through the bed its oxygen content will be consumed by roasting of the zinc sulfide with resulting formation of sulfur dioxide which is withdrawn from the upper fluid bed, from 60% to 100% of the roasting air introduced into the columnar lower bed being delivered to the lowermost portion of this bed, the rate of introduction of said roasting air being limited at most to that theoretically required to combine with the zinc sulfide component of the agglomerated ore concentrate charged to the upper bed so that substantially no unconsumed oxygen is present in the sulfur dioxide-containing gases rising from the lower bed into the upper bed, maintaining the upper fluid bed at a temperature of at least about 1100° C., discharging substantially lead- and cadmium-free roasted pellets from the lower end of the columnar fluid bed, withdrawing roaster gases issuing from the upper fluid bed, and separating from the withdrawn roaster gases the cadmium and lead sulfides volatilized from the zinc sulfide charge in the upper fluid bed.

6. The method of separating and recovering cadmium and lead components of a finely-divided zinc sulfide ore concentrate in a fluid bed roasting operation which comprises agglomerating the ore concentrate into discrete particles ranging in size between 4 and 65 mesh, charging the agglomerates to a mildly agitated fluid bed of the discrete particles positioned above and in direct contact with a more actively agitated columnar fluid bed of the discrete particles, both fluid beds being maintained in the fluidized condition substantially exclusively by the upward flow of gas originating as roasting air introduced into the lowermost bed, the upper fluid bed having a cross-sectional area substantially greater than that of the lower bed so as to establish the aforesaid different degrees of agitation in the two fluid beds, introducing sulfide-roasting air into the columnar lower bed so that as it rises through the bed its oxygen content will be consumed by roasting of the zinc sulfide with resulting formation of sulfur dioxide which is withdrawn from the upper fluid bed, from 60% to 100% of the roasting air introduced into the columnar lower bed being delivered to the lowermost portion of this bed, the rate of introduction of said roasting air being limited at most to that theoretically required to combine with the zinc sulfide component of the agglomerated ore concentrate charged to the upper bed so that substantially no unconsumed oxygen is present in the sulfur dioxide-containing gases rising from the lower bed into the upper bed, maintaining the upper fluid bed at a temperature of at least about 1050° C., discharging substantially lead- and cadmium-free roasted pellets from the lower end of the columnar fluid bed, recycling up to about 50% of the discharged roasted pellets to the lower portion of the columnar fluid bed, withdrawing roaster gases issuing from the upper fluid bed, and separating from the withdrawn roaster gases the cadmium and lead sulfides volatilized from the zinc sulfide charge in the upper fluid bed.

References Cited in the file of this patent

UNITED STATES PATENTS

| 2,475,607 | Garbo | July 12, 1949 |
| 2,621,118 | Cyr et al. | Dec. 9, 1952 |

FOREIGN PATENTS

| 701,555 | Great Britain | Dec. 30, 1953 |

UNITED STATES PATENT OFFICE
CERTIFICATE OF CORRECTION

Patent No. 2,855,287 October 7, 1958

Howard M. Cyr

It is hereby certified that error appears in the printed specification of the above numbered patent requiring correction and that the said Letters Patent should read as corrected below.

Column 7, line 46, after "being" strike out -- not --; column 9, line 8, for "1100 C.," read -- $1100^\circ$ C., --.

Signed and sealed this 6th day of January 1959.

(SEAL)
Attest:
KARL H. AXLINE
Attesting Officer

ROBERT C. WATSON
Commissioner of Patents